(12) United States Patent
Kay

(10) Patent No.: US 7,233,130 B1
(45) Date of Patent: Jun. 19, 2007

(54) ACTIVE RIPPLE REDUCTION SWITCHED MODE POWER SUPPLIES

(75) Inventor: Michael R. Kay, Summerfield, NC (US)

(73) Assignee: RF Micro Devices, Inc., Greensboro, NC (US)

(*) Notice: Subject to any disclaimer, the term of this patent is extended or adjusted under 35 U.S.C. 154(b) by 0 days.

(21) Appl. No.: 11/198,822

(22) Filed: Aug. 5, 2005

(51) Int. Cl.
*G05F 1/00* (2006.01)
*G05F 1/573* (2006.01)

(52) U.S. Cl. .................. 323/222; 323/286; 323/284

(58) Field of Classification Search ............... 323/222, 323/282, 284, 285, 286
See application file for complete search history.

(56) References Cited

U.S. PATENT DOCUMENTS

| | | | |
|---|---|---|---|
| 4,710,861 A * | 12/1987 | Kanner .................... 363/46 |
| 5,668,464 A * | 9/1997 | Krein et al. ............... 323/259 |
| 6,414,469 B1 * | 7/2002 | Zhou et al. ................ 323/272 |
| 6,445,166 B2 * | 9/2002 | Nishiyama ............... 323/266 |
| 6,504,348 B2 * | 1/2003 | Stanley .................... 323/280 |
| 6,894,471 B2 * | 5/2005 | Corva et al. .............. 323/282 |
| 6,897,641 B1 * | 5/2005 | Herbert .................... 323/282 |
| 7,019,503 B1 * | 3/2006 | Ortiz et al. ............... 323/282 |
| 7,030,595 B2 * | 4/2006 | Akita ....................... 323/280 |
| 7,038,435 B2 * | 5/2006 | Ortiz et al. ............... 323/282 |
| 7,132,820 B2 * | 11/2006 | Walters et al. ........... 323/288 |

* cited by examiner

*Primary Examiner*—Bao Q. Vu
(74) *Attorney, Agent, or Firm*—Withrow & Terranova, PLLC

(57) ABSTRACT

A system and method are provided for actively reducing ripple in a supply voltage provided by a switched mode power supply. In general, active ripple reduction circuitry operates to sense the ripple in the supply voltage to provide a signal indicative of the ripple. The signal indicative of the ripple is inverted and provided to the output of the switched mode power supply to substantially reduce or eliminate the ripple in the supply voltage.

20 Claims, 4 Drawing Sheets

ACTIVE RIPPLE REDUCTION SWITCHED MODE POWER SUPPLIES

FIELD OF THE INVENTION

The present invention relates to switched mode power supplies and more specifically relates to a system for actively reducing a ripple in the output of a switched mode power supply.

BACKGROUND OF THE INVENTION

Mobile terminals such as cellular phones have become ubiquitous in modern society. Mobile terminals rely on sending an electromagnetic signal through the air to a base station and receiving electromagnetic signals through the air from the base station. An unfortunate side effect of the convenience of this wireless communication is that the signal-carrying electromagnetic radiation that forms the backbone of the communication may interfere with other electronic devices. This phenomenon is known as electromagnetic interference (EMI) or electromagnetic compatibility (EMC).

While interfering with other electronic devices like a computer or television is problematic, it is also possible for multiple mobile terminals operating in proximity to one another to have cross channel EMI. That is, one mobile terminal may be transmitting in a first channel, but some of the signal may spill over as noise into channels that are nearby in the frequency spectrum and on which a second mobile terminal is trying to operate. This spill over transmission is known by various terms, but is termed herein as "side band transmission."

To combat EMI in the United States, the Federal Communications Commission (FCC) has promulgated standards for emissions that limit how much radiation may be radiated within certain frequency bands. On top of the FCC emissions rules, the various communication protocols used by mobile terminals may impose more restrictive limitations with specific attention paid to side band transmission levels. For example, Annex A of the Global System for Mobile Communications (GSM) 05.05 version 8.5.1, released 1999, indicates that the maximum allowed signal for spurious side band signals is the larger of −60 dBc or −36 dBm. This measurement is to be averaged over at least two hundred transmit power cycles.

Against the backdrop of these standards, many mobile terminals incorporate DC—DC converters in their internal circuitry to change a DC voltage level of a battery to a lower or higher DC voltage level depending on the needs of the internal circuitry of the mobile terminal. A common method to implement a DC—DC converter uses a switched mode power supply that includes a switch that opens and closes at a predetermined frequency according to a clock signal. Such switched mode power supplies exhibit a periodic ripple in their output at the switching frequency. If the DC—DC converter is used to provide a supply voltage (Vcc) to a saturated power amplifier, this ripple may mix with the radio frequency carrier to generate spurious side band signals.

To combat this ripple, manufacturers use various approaches. For example, some manufacturers use low drop-out linear regulators for power control associated with power amplifiers instead of the switched mode power supplies. This substitution avoids the ripple issues, but does so at the expense of decreased efficiency and shorter battery life.

A drive train of a switched mode power supply typically includes a series inductor and a parallel capacitor. In order to reduce the ripple in the output of the switched mode power supply, some manufacturers use large inductors and capacitors. However, the large inductors and capacitors are physically large and require a significant amount of die area. In addition, large inductors and capacitors are more expensive and result in a low Unity Gain Bandwidth (UGBW). The low UGBW makes polar modulation impossible and may cause turn-on mask problems.

Another method to reduce the ripple is to operate the power amplifier receiving the output of the switched mode power supply in linear mode. However, running the power amplifier linearly significantly reduces the efficiency of the power amplifier and negates the efficiency of the switched mode power supply. Yet another method used to reduce the ripple is to use a multiphase converter. However, each phase requires a separate inductor, thereby adding cost and size. Thus, there remains a need for an improved system and method for reducing the ripple in the output of a switched mode power supply.

SUMMARY OF THE INVENTION

The present invention provides a system and method for actively reducing ripple in a supply voltage provided by a switched mode power supply. In general, active ripple reduction circuitry operates to sense the ripple in the supply voltage to provide a signal indicative of the ripple. The signal indicative of the ripple is inverted and provided to the output of the switched mode power supply to substantially reduce or eliminate the ripple in the supply voltage.

In one embodiment, the active ripple reduction circuitry high-pass filters the supply voltage to provide a signal indicative of the ripple voltage. The signal indicative of the ripple voltage is amplified and inverted to provide a ripple reduction signal. The ripple reduction signal is provided to the output of the switched mode power supply to substantially reduce or eliminate the ripple voltage.

In another embodiment, the switched mode power supply includes a converter control system and an inductor coupled between an output of the converter control system and the output of the switched mode power supply. The active ripple reduction circuitry includes integration circuitry that integrates a voltage across the inductor to provide a signal indicative of the ripple current. The signal indicative of the ripple current is converted from a voltage to a current by a voltage-to-current converter to provide a ripple reduction signal. The ripple reduction signal is provided to the output of the switched mode power supply to substantially reduce or eliminate the ripple current.

Those skilled in the art will appreciate the scope of the present invention and realize additional aspects thereof after reading the following detailed description of the preferred embodiments in association with the accompanying drawing figures.

BRIEF DESCRIPTION OF THE DRAWING FIGURES

The accompanying drawing figures incorporated in and forming a part of this specification illustrate several aspects of the invention, and together with the description serve to explain the principles of the invention.

DETAILED DESCRIPTION OF THE PREFERRED EMBODIMENTS

The embodiments set forth below represent the necessary information to enable those skilled in the art to practice the invention and illustrate the best mode of practicing the invention. Upon reading the following description in light of the accompanying drawing figures, those skilled in the art will understand the concepts of the invention and will recognize applications of these concepts not particularly addressed herein. It should be understood that these concepts and applications fall within the scope of the disclosure and the accompanying claims.

Figure 1:
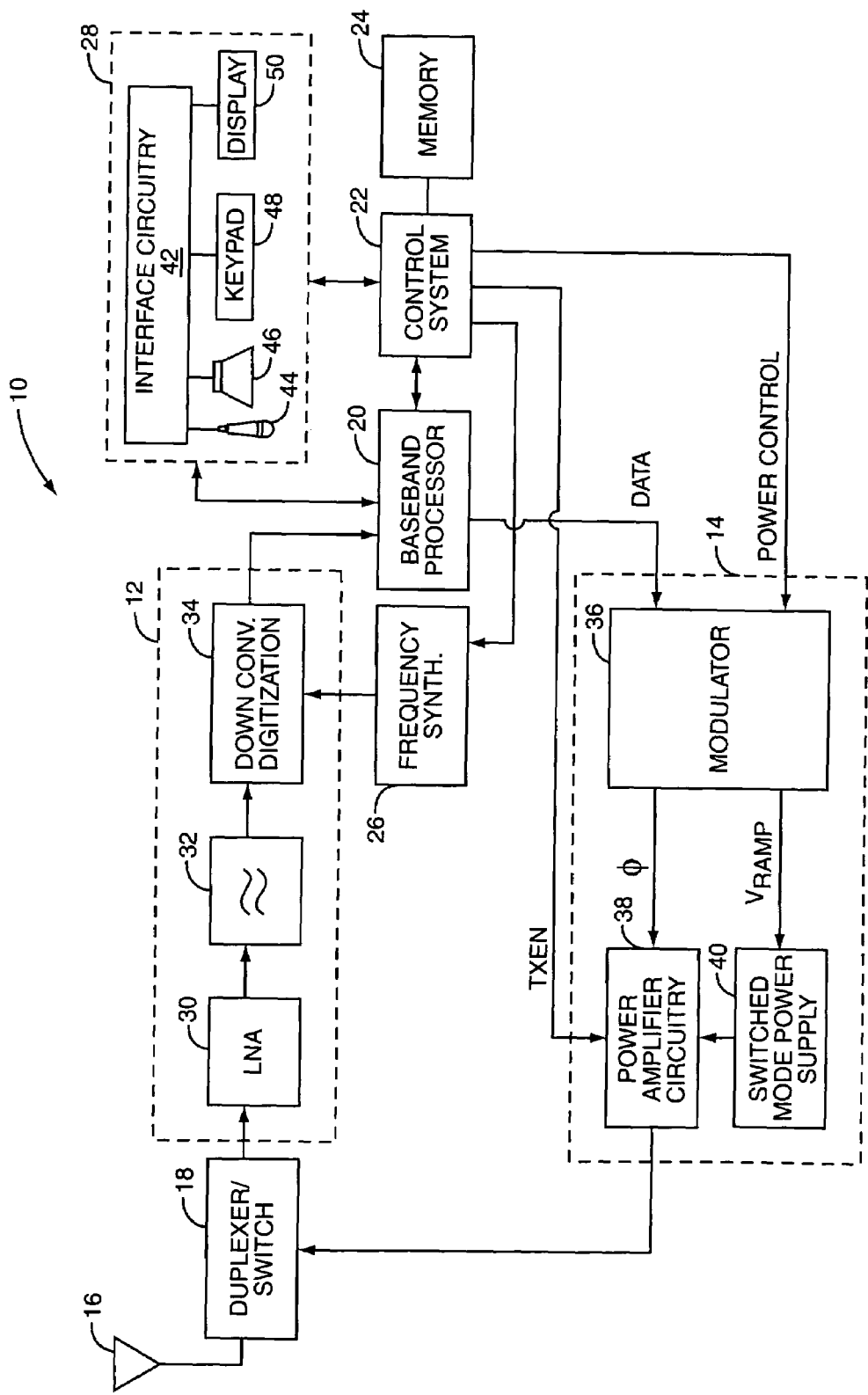
FIG. 1 illustrates an exemplary mobile terminal according to one embodiment of the present invention.

The present invention is preferably incorporated in a mobile terminal 10, such as a mobile telephone, personal digital assistant, wireless Local Area Network (LAN) device, a base station in a mobile network, or the like. The basic architecture of a mobile terminal 10 is represented in FIG. 1, and may include a receiver front end 12, a radio frequency transmitter section 14, an antenna 16, a duplexer or switch 18, a baseband processor 20, a control system 22, memory 24, a frequency synthesizer 26, and an interface 28. The receiver front end 12 receives information bearing radio frequency signals from one or more remote transmitters provided by a base station (not shown). A low noise amplifier 30 amplifies the signal. A filter circuit 32 minimizes broadband interference in the received signal, while a downconverter 34 downconverts the filtered, received signal to an intermediate or baseband frequency signal, which is then digitized into one or more digital streams. The receiver front end 12 typically uses one or more mixing frequencies generated by the frequency synthesizer 26.

The baseband processor 20 processes the digitized, received signal to extract the information or data bits conveyed in the received signal. This processing typically comprises demodulation, decoding, and error correction operations. As such, the baseband processor 20 is generally implemented in one or more digital signal processors (DSPs).

On the transmit side, the baseband processor 20 receives digitized data from the control system 22, which it encodes for transmission. The control system 22 may run software stored in the memory 24. Alternatively, the operation of the control system 22 may be a function of sequential logic structures as is well understood. After encoding the data from the control system 22, the baseband processor 20 outputs the encoded data to the radio frequency transmitter section 14.

A modulator 36 receives the data from the baseband processor 20 and operates according to one or more modulation schemes to provide a modulated signal to the power amplifier circuitry 38. In one embodiment, the modulator 36 operates according to either an 8-Level Phase Shift Keying (8PSK) modulation scheme, which is a modulation scheme containing both amplitude and phase components, or a Gaussian Minimum Shift Keying (GMSK) modulation scheme, which is a constant amplitude modulation scheme.

The power amplifier circuitry 38 amplifies the modulated signal from the modulator 36 to a level appropriate for transmission from the antenna 16. A gain of the power amplifier circuitry 38 is controlled by the switched mode power supply 40. In essence, the switched mode power supply 40 operates to control a supply voltage provided to the power amplifier circuitry 38 based on the power control signal ($V_{RAMP}$) from the modulator 36. In 8PSK mode, the power control signal ($V_{RAMP}$) includes an amplitude modulation component and may additionally be used to control an output power level of the power amplifier circuitry 38. In GMSK mode, the power control signal ($V_{RAMP}$) controls an output power level of the power amplifier circuitry 38.

A user may interact with the mobile terminal 10 via the interface 28, which may include interface circuitry 42 associated with a microphone 44, a speaker 46, a keypad 48, and a display 50. The interface circuitry 42 typically includes analog-to-digital converters, digital-to-analog converters, amplifiers, and the like. Additionally, it may include a voice encoder/decoder, in which case it may communicate directly with the baseband processor 20.

The microphone 44 will typically convert audio input, such as the user's voice, into an electrical signal, which is then digitized and passed directly or indirectly to the baseband processor 20. Audio information encoded in the received signal is recovered by the baseband processor 20, and converted into an analog signal suitable for driving speaker 46 by the interface circuitry 42. The keypad 48 and display 50 enable the user to interact with the mobile terminal 10, input numbers to be dialed and address book information, or the like, as well as monitor call progress information.

Figure 2:
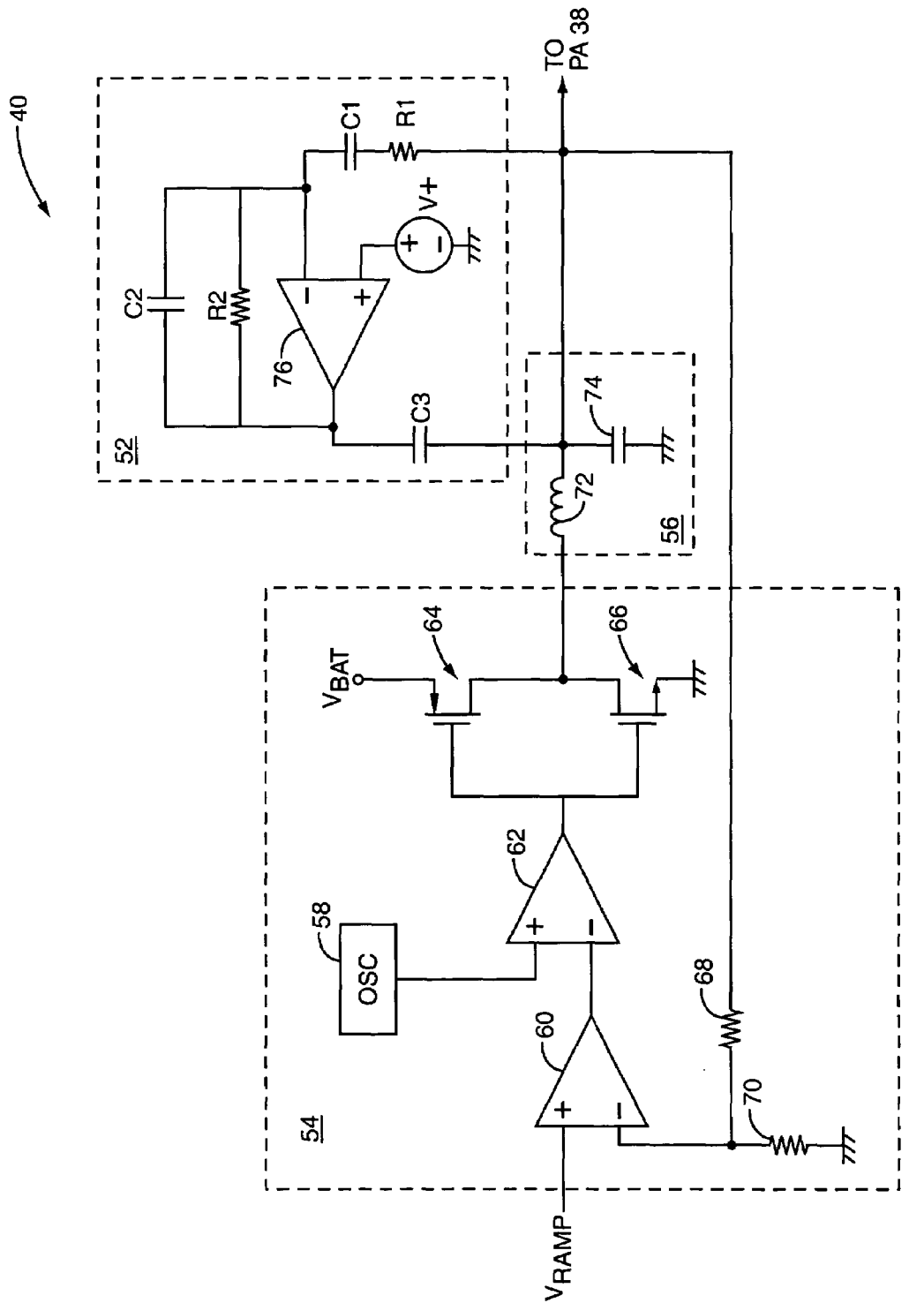
FIG. 2 illustrates an exemplary switched mode power supply including active ripple reduction circuitry according to one embodiment of the present invention.

FIG. 2 illustrates an exemplary embodiment of the switched mode power supply 40 (FIG. 1) including active ripple reduction circuitry 52 according to one embodiment of the present invention. Before discussing the details of the active ripple reduction circuitry 52, it is beneficial to discuss the basic operation of the switched mode power supply 40. In general, the switched mode power supply 40 includes a converter control system 54 and a power train 56. As illustrated, the switched mode power supply 40 is a Buck converter.

The converter control system 54 in this example includes an oscillator 58, an error amplifier 60, a modulator 62, and switches 64 and 66. The oscillator 58 outputs a saw-tooth voltage waveform derived from the voltage on an internal capacitor (not illustrated). In the example, the saw-tooth wave form ramps up and ramps down. Other oscillators 58 may provide a ramp up followed by a rapid return. Regardless of the particular wave form, the oscillator output is fed to the modulator 62 where it is compared to an error voltage signal from the error amplifier 60.

The converter control system 54 operates according to a pulse width modulation scheme as is well understood, although other arrangements are possible and applicable to the present invention. Specifically, the error amplifier 60 of the converter control system 54 compares a feedback signal from the output of the switched mode power supply 40 to the power control signal ($V_{RAMP}$) and generates the error voltage signal. The power control signal ($V_{RAMP}$) may hereafter be referred to as a reference voltage. The feedback signal may be conditioned by resistors 68 and 70 for stability purposes. The resistors 68 and 70 may be more generally referred to as phase compensation circuitry.

The error voltage signal output by the error amplifier 60 provides the threshold level used by the modulator 62 in processing the oscillator output signal to generate a control signal. When the oscillator output signal is above the threshold determined by the error voltage signal from the error amplifier 60, the control signal provided to the switches 64 and 66 is low. Conversely, when the oscillator output signal is below the error voltage signal threshold, the control signal provided to the switches 64 and 66 is high. In general, the control signal driving the switches 64 and 66 is a square wave signal with a duty cycle determined by the level of the error voltage signal.

The power train 56 includes an inductor 72 and a capacitor 74. The switches 64 and 66 may alternatively be considered part of the power train 56. As illustrated, the switches 64 and 66 are a P-channel Field Effect Transistor (FET) and an N-channel FET respectively as is well understood for a typical Buck topology. The control signal from the modulator 62 turns the switches 64 and 66 on and off. When the control signal is low, switch 64 is ON and switch 66 is OFF. This presents a voltage close to the voltage ($V_{BAT}$) from the battery of the mobile terminal 10 to the inductor 72 causing an increase in current and storing energy in the magnetic field of the inductor 72. Current is supplied to the power amplifier circuitry 38 and to the capacitor 74. When the control signal from the modulator 62 is high, switch 64 is OFF and switch 66 is ON. This connects the input of the inductor 72 to ground. As a result, the inductor 72 provides decreasing current to the power amplifier circuitry 38, while drawing energy from its magnetic field. As the output voltage drops, the capacitor 74 discharges and provides some of the load current.

As will be apparent to one of ordinary skill in the art, the switched mode power supply 40 generates a ripple in the output voltage provided to the power amplifier circuitry 38, where the ripple has a frequency essentially equal to the frequency of the oscillator output signal. The ripple may mix with the radio frequency input signal in the power amplifier circuitry 38 and cause spurs in the output frequency spectrum.

In general, the active ripple reduction circuitry 52 operates to sense the ripple voltage or current, invert the sensed ripple voltage or current, and force the inverted ripple voltage or current back onto the output of the switched mode power supply 40, thereby reducing or eliminating the ripple at the output of the switched mode power supply 40. In the illustrated embodiment, the active ripple reduction circuitry 52 includes resistors R1, R2; capacitors C1, C2, C3; and operational amplifier 76 arranged as shown. The resistor R1 and capacitor C1 form a high-pass filter. Accordingly, only the ripple at the output of the switched mode power supply 40 is sensed. The DC content of the output of the switched mode power supply 40 is not sensed. The resistor R2 and capacitor C2 form a low-pass filter. As such, the active ripple reduction circuitry 52 has a band-pass response. The cut-off frequencies of the high-pass filter formed by R1 and C1 and the low-pass filter formed by R2 and C2 are designed to be below and above the frequency of the oscillator output signal and thus the output of the ripple. In one embodiment, R1 is 5K ohms, C1 is 10 pF, R2 is 100K ohms, and C2 is 0.3 pF such that the cut-off frequencies are 3.18 MHz and 5.3 MHz, respectively, thereby providing a band-pass response. However, the values of R1, C1, R2, and C2 may vary depending on the particular implementation.

It should also be noted that the gain of the operational amplifier 76 is defined as R2/R1. Thus, for the exemplary values given above, the gain of the operational amplifier 76 is 20. As discussed below, the gain of the operational amplifier 76 defines the amount of ripple reduction. For example, the gain of the operational amplifier 76 may be in the range of 3 to 100, and the corresponding ripple reduction may be 10 dB to 40 dB. The output of the operational amplifier 76 is fed back onto the output of the switched mode power supply 40 via capacitor C3 in order to reduce or eliminate the ripple.

Figure 3:
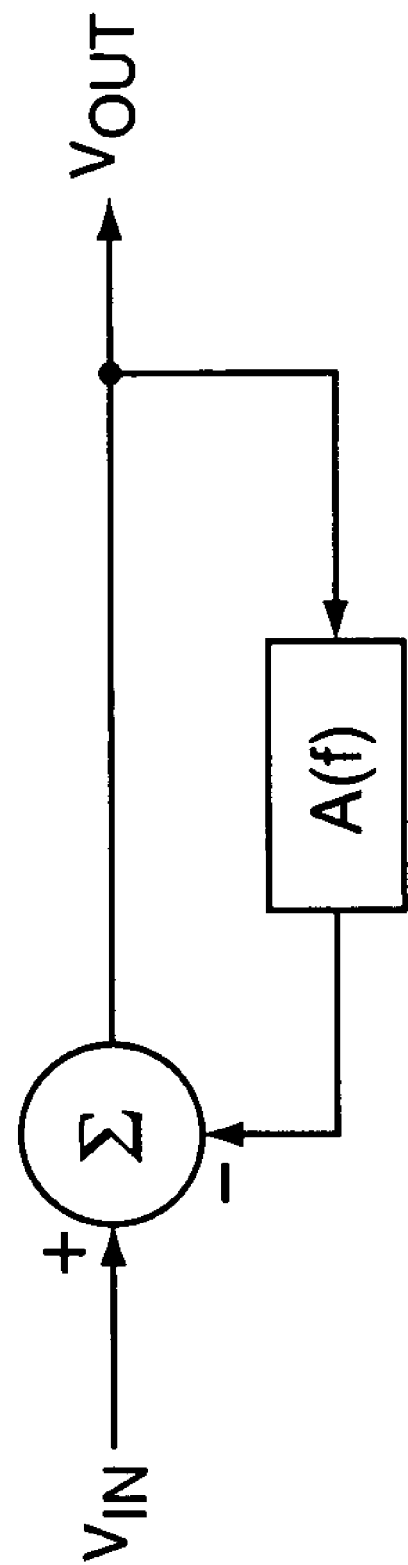
FIG. 3 is a block diagram illustrating the basic operation of the active ripple reduction circuitry of FIG. 2.

The basic operation of the active ripple reduction circuitry 52 of FIG. 2 is illustrated in FIG. 3. In general, the active ripple reduction circuitry 52 of FIG. 2 senses the ripple voltage at the output of the switched mode power supply 40, amplifies and inverts the sensed ripple voltage, and feeds the amplified and inverted ripple voltage back onto the output of the switched mode power supply 40, thereby reducing or eliminating the ripple voltage. With reference to FIG. 3, the basic operation of the active ripple reduction circuitry 52 may be defined by the equation:

$$V_{OUT} = \frac{V_{IN}}{1 + A(f)};$$

where $V_{OUT}$ is the corrected ripple voltage; $V_{IN}$ is the ripple voltage; and A(f) is the gain of the operational amplifier 76. Thus, the ripple voltage can be reduced by a factor of 1+A(f). As the gain of the operational amplifier 76 increases, the ripple reduction increases. However, as the gain increases, the Unity Gain Bandwidth (UGBW), and thus the delay, of the operational amplifier 76 also increases. Accordingly, there is an optimal gain that optimizes ripple reduction and UGBW, where the optimal gain depends on the particular design.

Figure 4:
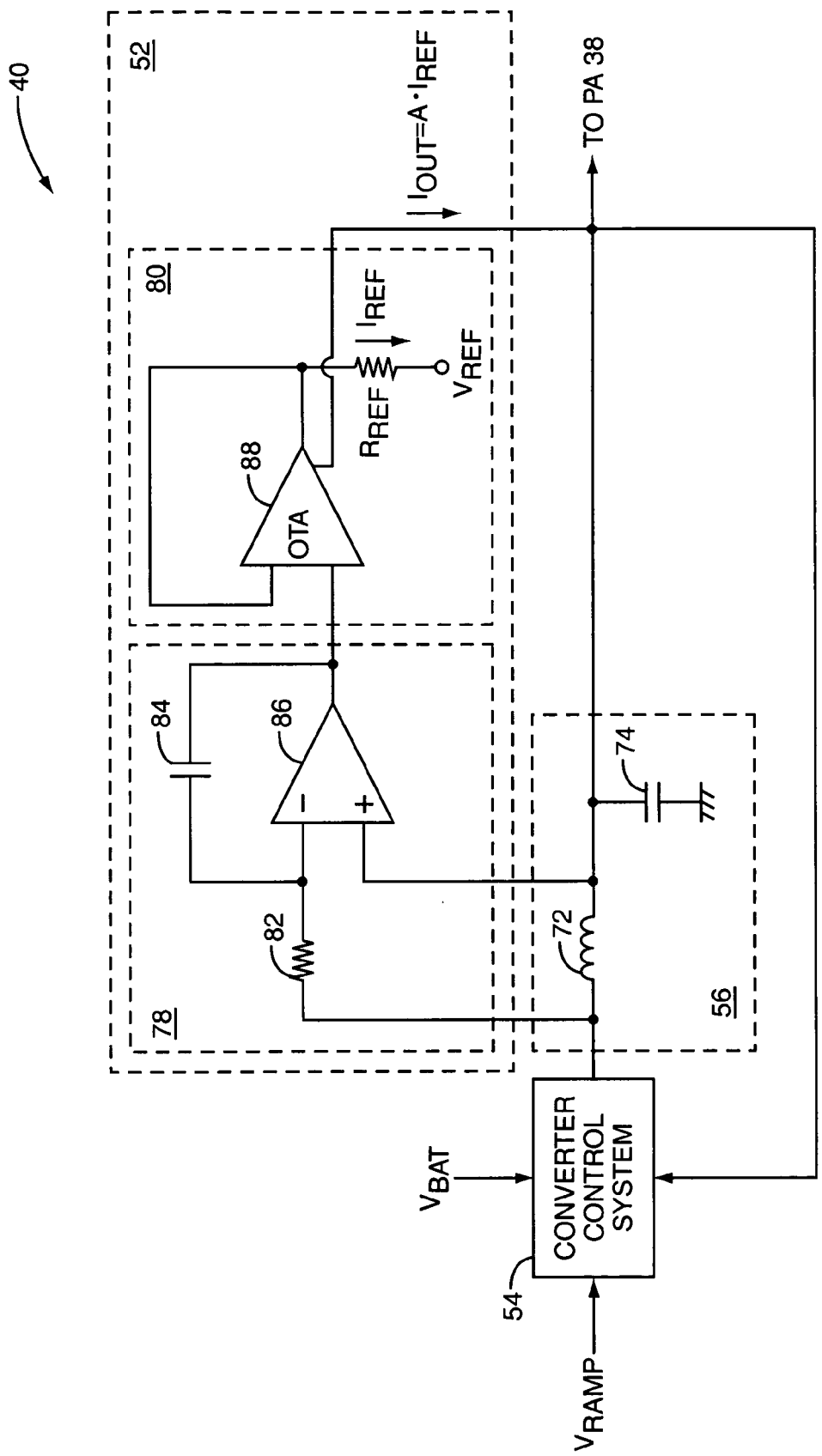
FIG. 4 illustrates an exemplary switched mode power supply including active ripple reduction circuitry according to another embodiment of the present invention.

FIG. 4 illustrates a second embodiment of the active ripple reduction circuitry 52 of the present invention. In this embodiment, the active ripple reduction circuitry 52 senses the ripple current rather than ripple voltage to provide a signal indicative of the ripple current, inverts the signal indicative of the ripple current, and generates an output current that reduces or eliminates the ripple current. More specifically, the ripple reduction circuitry 52 includes integration circuitry 78 and a voltage-to-current converter 80. In general, the integration circuitry 78 integrates a voltage across the inductor 72 to provide a voltage inversely proportional to the current ripple through the inductor 72. The voltage-to-current converter 80 receives the voltage inversely proportional to the current ripple from the integration circuitry 78 and provides a current that is inversely related to the current ripple to the output of the switched mode power supply 40, thereby reducing or eliminating the current ripple.

In this embodiment, the integration circuitry 78 includes resistor 82, capacitor 84, and operational amplifier 86 arranged as shown. The inverting input of the operational amplifier 86 is coupled to an input of the inductor 72 via resistor 82, and the non-inverting input of the operational amplifier 86 is coupled to the output terminal of the inductor 72. The illustrated embodiment of the integration circuitry 78 is exemplary and is not intended to limit the scope of the present invention. Numerous alternative embodiments will be apparent to one of ordinary skill in the art upon reading this disclosure.

An exemplary embodiment of the voltage-to-current converter 80 is also illustrated. In this embodiment, the voltage-to-current converter 80 includes an operational transconductance amplifier (OTA) 88 configured in a unity gain configuration. The output of the integration circuitry 78 is coupled to a first input of the OTA 88. The second input of the OTA 88 is coupled to an output of the OTA 88. The output of the OTA 88 is also coupled to a first terminal of a reference resistor ($R_{REF}$). The second terminal of the reference resistor ($R_{REF}$) is coupled to a reference voltage ($V_{REF}$). In operation, the integration circuitry 78 provides a voltage inversely proportional to the ripple current through the inductor 72 to the first input of the OTA 88. As will be apparent to one of ordinary skill in the art, since the first input of the OTA 88 receives the voltage inversely proportional to the ripple current through the inductor 72 from the integration circuitry 78, the voltage at the second input terminal of the OTA 88, and thus the voltage at the output of the OTA 88, is also equal to the voltage inversely proportional to the ripple current through the inductor 72 from the integration circuitry 78. As such, a reference current ($I_{REF}$) is generated through the reference resistor ($R_{REF}$) and is essentially equal to the voltage provided by the integration circuitry 78 divided by the resistance of the reference resistor ($R_{REF}$). As such, the reference current ($I_{REF}$) is inversely proportional to the ripple current through the inductor 72. Based on the reference current ($I_{REF}$), the OTA 88 generates an output current ($I_{OUT}$), which is $A*I_{REF}$, where A is a predetermined gain factor that relates the reference current ($I_{REF}$) to the ripple current through the inductor 72. The output current ($I_{OUT}$) is provided to the output of the switched mode power supply 40 and operates to substantially reduce or eliminate the ripple in the output of the switched mode power supply 40.

Those skilled in the art will recognize improvements and modifications to the preferred embodiments of the present invention. All such improvements and modifications are considered within the scope of the concepts disclosed herein and the claims that follow.

What is claimed is:

1. A system comprising:
   a) a switched mode power supply; and
   b) active ripple reduction circuitry adapted to:
      i) sense an output ripple of the switched mode power supply;
      ii) provide a ripple reduction signal inversely related to the output ripple; and
      iii) provide the ripple reduction signal to an output of the switched mode power supply, thereby combining the ripple reduction signal and the output ripple such that the output ripple is substantially reduced.

2. The system of claim 1 wherein the active ripple reduction circuitry comprises high-pass filtering circuitry having an input coupled to the output of the switched mode power supply and adapted to high-pass filter a supply voltage provided at the output of the switched mode power supply to provide a signal indicative of the output ripple.

3. The system of claim 2 wherein the active ripple reduction circuitry further comprises amplifier circuitry having a first input coupled to an output of the high-pass filtering circuitry, the amplifier circuitry adapted to amplify and invert the signal indicative of the output ripple to provide the ripple reduction signal.

4. The system of claim 3 wherein the amplifier circuitry has a low-pass filter response such that the high-pass filtering circuitry and the amplifier circuitry provide a band-pass filter response.

5. The system of claim 3 wherein the active ripple reduction circuitry further comprises a capacitor coupling an output of the amplifier circuitry to the output of the switched mode power supply to provide the ripple reduction signal to the output of the switched mode power supply.

6. The system of claim 1 wherein the switched mode power supply comprises a converter control system and an inductor having a first terminal coupled to an output of the converter control system and a second terminal coupled to the output of the switched mode power supply.

7. The system of claim 6 wherein the active ripple reduction circuitry comprises integration circuitry having a first input coupled to the first terminal of the inductor and a second input coupled to the second terminal of the inductor and adapted to integrate a voltage across the inductor to provide a signal inversely related to a ripple current through the inductor.

8. The system of claim 7 wherein the signal inversely related to the ripple current is a voltage signal, and the active ripple reduction circuitry further comprises voltage-to-current conversion circuitry adapted to provide the ripple reduction signal based on the voltage signal.

9. A method for actively reducing an output ripple in a supply voltage provided by a switched mode power supply comprising:
   sensing the output ripple of the switched mode power supply;
   providing a ripple reduction signal inversely related to the output ripple; and
   providing the ripple reduction signal to an output of the switched mode power supply, thereby combining the ripple reduction signal and the output ripple such that the output ripple is substantially reduced.

10. The method of claim 9 wherein sensing the output ripple comprises high-pass filtering the supply voltage provided at the output of the switched mode power supply to provide a signal indicative of the output ripple.

11. The method of claim 10 wherein providing the ripple reduction signal comprises amplifying and inverting the signal indicative of the output ripple to provide the ripple reduction signal.

12. The method of claim 10 wherein providing the ripple reduction signal further comprises low-pass filtering the signal indicative of the output ripple.

13. The method of claim 11 wherein providing the ripple reduction signal to an output of the switched mode power supply comprises capacitively coupling the ripple reduction signal to the output of the switched mode power supply.

14. The method of claim 9 wherein the switched mode power supply comprises a converter control system and an inductor having a first terminal coupled to an output of the converter control system and a second terminal coupled to the output of the switched mode power supply, and sensing the output ripple of the switched mode power supply comprises:
   integrating a voltage across the inductor to provide a signal inversely related to a ripple current through the inductor.

15. The method of claim 14 wherein the signal inversely related to the ripple current is a voltage signal, and providing the ripple reduction signal comprises converting the signal inversely related to the ripple current from the voltage signal to a current signal to provide the ripple reduction signal.

16. A system for actively reducing an output ripple in a supply voltage provided by a switched mode power supply comprising:
   means for sensing the output ripple of the switched mode power supply;
   means for providing a ripple reduction signal inversely related to the output ripple; and
   means for providing the ripple reduction signal to an output of the switched mode power supply, thereby combining the ripple reduction signal and the output ripple such that the output ripple is substantially reduced.

17. The system of claim 16 wherein the switched mode power supply comprises a converter control system and an inductor having a first terminal coupled to an output of the converter control system and a second terminal coupled to the output of the switched mode power supply, and the means for sensing the output ripple of the switched mode power supply comprises:

means for integrating a voltage across the inductor to provide a signal inversely related to a ripple current through the inductor.

18. The system of claim 17 wherein the means for sensing the output ripple comprises a means for high-pass filtering the supply voltage provided at the output of the switched mode power supply to provide a signal indicative of the output ripple.

19. The system of claim 18 wherein the means for providing the ripple reduction signal comprises a means for amplifying and inverting the signal indicative of the output ripple to provide the ripple reduction signal.

20. The system of claim 17 wherein the signal inversely related to the ripple current is a voltage signal, and the means for providing the ripple reduction signal comprises a means for converting the signal inversely related to the ripple current from the voltage signal to a current signal to provide the ripple reduction signal.

* * * * *